United States Patent
Anstey et al.

(10) Patent No.: US 12,459,643 B2
(45) Date of Patent: Nov. 4, 2025

(54) SYSTEM AND METHOD FOR MONITORING CARGO DURING TRANSPORTATION

(71) Applicant: The Boeing Company, Chicago, IL (US)

(72) Inventors: Timothy W. Anstey, Seattle, WA (US); Lawrence Dean Hettick, Snohomish, WA (US); Kevin S. Callahan, Shoreline, WA (US); Kyle Mclaren Hadley, Kirkland, WA (US); Christopher John Padilla-Diffoot, Mountlake Terrace, WA (US); Thomas Edwin Garabedian, Bothell, WA (US); Aaliah Oladumni Amosu, Waldorf, MD (US)

(73) Assignee: THE BOEING COMPANY, Arlington, VA (US)

( * ) Notice: Subject to any disclaimer, the term of this patent is extended or adjusted under 35 U.S.C. 154(b) by 408 days.

(21) Appl. No.: 17/883,906

(22) Filed: Aug. 9, 2022

(65) Prior Publication Data

US 2024/0051662 A1   Feb. 15, 2024

(51) Int. Cl.
*B64D 9/00*   (2006.01)
*H04W 4/35*   (2018.01)

(52) U.S. Cl.
CPC .............. *B64D 9/00* (2013.01); *H04W 4/35* (2018.02)

(58) Field of Classification Search
None
See application file for complete search history.

(56) References Cited

U.S. PATENT DOCUMENTS

| | | |
|---|---|---|
| 5,220,621 A | 6/1993 | Saitoh |
| 6,965,816 B2 | 11/2005 | Walker |
| 7,198,227 B2 | 4/2007 | Olin et al. |
| 7,324,921 B2 | 1/2008 | Sugahara et al. |
| 7,609,159 B2 | 10/2009 | Benson et al. |
| 7,714,708 B2 | 5/2010 | Brackmann et al. |

(Continued)

FOREIGN PATENT DOCUMENTS

| | | |
|---|---|---|
| CN | 212660265 U | 3/2021 |
| DE | 102011000819 A1 | 8/2012 |

(Continued)

OTHER PUBLICATIONS

Vijay, R., et al., "A Heterogeneous PLC with BLE Mesh network for Reliable and Real-time Smart Cargo Monitoring", 2019 IEEE International Symposium on Power Line Communications and its Applications (ISPLC), Jan. 1, 2019, pp. 1-7.

(Continued)

*Primary Examiner* — Matthew G Marini
(74) *Attorney, Agent, or Firm* — COATS & BENNETT, PLLC

(57) ABSTRACT

A monitoring system and method of monitoring cargo on a vehicle during transport. The monitoring includes determining the location of the cargo that is loaded on the vehicle and monitoring one or more environmental conditions of the vehicle where the cargo is located. The monitoring system includes a control unit that receives signals from sensors that are located where the cargo is stored. Based on the signals from the sensors, the control unit is configured to determine the location and the one or more environmental conditions.

20 Claims, 12 Drawing Sheets

(56) References Cited

U.S. PATENT DOCUMENTS

| | | |
|---|---|---|
| 8,279,067 B2 | 10/2012 | Berger et al. |
| 8,515,656 B2 | 8/2013 | Reed et al. |
| 8,570,377 B2 | 10/2013 | Hofman |
| 8,622,298 B2 | 1/2014 | Huber |
| 8,842,041 B1 | 9/2014 | Meyers |
| 9,162,765 B2 | 10/2015 | Huber |
| 9,323,967 B2 | 4/2016 | Choi et al. |
| 9,576,166 B2 | 2/2017 | Burch, V et al. |
| 9,904,902 B2 | 2/2018 | Skaaksrud |
| 10,005,564 B1 | 6/2018 | Bhatia et al. |
| 10,139,265 B2 | 11/2018 | Fuss et al. |
| 10,181,060 B2 | 1/2019 | Krug et al. |
| 10,219,531 B2 | 3/2019 | Minvielle |
| 10,302,478 B1 | 5/2019 | Bennett et al. |
| 10,636,312 B2 | 4/2020 | Donhoffner et al. |
| 10,667,886 B2 | 6/2020 | Meadow |
| 10,699,125 B2 | 6/2020 | Mosher et al. |
| 10,769,920 B2 | 9/2020 | Skaaksrud |
| 10,878,364 B2 | 12/2020 | Burch, V et al. |
| 10,929,811 B2 | 2/2021 | Cole et al. |
| 11,074,490 B2 | 7/2021 | Aske et al. |
| 11,080,643 B2 | 8/2021 | Ehrman et al. |
| 11,100,194 B2 | 8/2021 | Gao et al. |
| 11,142,342 B2 | 10/2021 | Podnar et al. |
| 11,412,374 B2 | 8/2022 | Avila et al. |
| 2006/0164239 A1* | 7/2006 | Loda ............... G06K 19/07327 340/552 |
| 2008/0260254 A1 | 10/2008 | Schramm |
| 2010/0102934 A1 | 4/2010 | Guichard |
| 2012/0057022 A1 | 3/2012 | Nechiporenko et al. |
| 2012/0275485 A1 | 11/2012 | Holzner et al. |
| 2013/0159205 A1 | 6/2013 | Schnörwangen et al. |
| 2014/0036072 A1 | 2/2014 | Lyall et al. |
| 2014/0067313 A1* | 3/2014 | Breed ............... G06V 20/52 702/141 |
| 2015/0262474 A1 | 9/2015 | Olczak et al. |
| 2015/0321768 A1 | 11/2015 | Kumar et al. |
| 2015/0347959 A1* | 12/2015 | Skaaksrud ........ H04W 28/0231 705/333 |
| 2015/0352721 A1 | 12/2015 | Wicks et al. |
| 2016/0117536 A1 | 4/2016 | Johnsen |
| 2017/0136844 A1* | 5/2017 | Neu ............... B60H 1/3232 |
| 2018/0285813 A1 | 10/2018 | Siris |
| 2020/0137360 A1 | 4/2020 | Somers et al. |
| 2021/0319582 A1 | 10/2021 | Sangeneni et al. |
| 2021/0374664 A1 | 12/2021 | Shahzad et al. |
| 2021/0406566 A1 | 12/2021 | Shankar |
| 2022/0063901 A1 | 3/2022 | Hyatt et al. |
| 2022/0405704 A1 | 12/2022 | Kirmani et al. |

FOREIGN PATENT DOCUMENTS

| | | |
|---|---|---|
| DE | 202012004864 U1 | 12/2012 |
| EP | 3401217 A1 | 11/2018 |
| EP | 4253255 A1 | 10/2023 |
| JP | 2020038631 A | 3/2020 |
| NZ | 556253 A | 1/2010 |
| WO | 2005093627 A1 | 10/2005 |
| WO | 2021087490 A1 | 5/2021 |
| WO | 2021097599 A1 | 5/2021 |
| WO | 2021101961 A1 | 5/2021 |
| WO | 2022037827 A1 | 2/2022 |

OTHER PUBLICATIONS

Radio Bridge, "Wireless Sensors for the IoT", Retrieved from the internet: URL: https://radiobridge.com/blog/wireless-sensors-for-iot#:~:text=A wireless sensor is a, electrical signals%2C for further processing.[retrieved on Jun. 7, 2022]; pp. 1-8.

EP Search Report mailed May 24, 2024 in re EP Application No. 24152560.9.

EP Search Report mailed Jan. 5, 2024 in re EP Application No. 23179427.2.

EP Search Report mailed Dec. 20, 2023 in re EP Application No. 23179963.6.

EP Search Report mailed Jul. 5, 2024 in re EP Application No. 24151642.6.

Wikipedia, "Feature (computer vision)", Retrieved from the internet: URL: https://en.wikipedia.org/wiki/Feature [retrieved on Oct. 10, 2023], pp. 1-8.

OpenCv, "Image Processing in OpenCV", Retrieved from the internet: URL: https://docs.opencv.org/4.x/d2/d96/tutorial_py_table_of_contents_imgproc.html [retrieved on Oct. 10, 2023], pp. 1.

Mathworks, "Image Processing and Computer Vision", Retrieved from the internet: https://www.mathworks.com/help/overview/image-processing-and-computer-vision.html [retrieved on Oct. 10, 2023], pp. 1-3.

Sonka, M., et al., "Image Processing, Analysis, and Machine Vision", Cengage Learning, Jan. 1, 2013, pp. 1-930, 4th edition.

Ballard, D., et al., "Computer Vision", Prentice-Hall, Inc., Jan. 1, 1982, pp. 1-538, Englewood Cliffs, New Jersey.

Vijay, R., et al., "Air Cargo Monitoring: A Robust Tamper Detection and Reliable Communication System", 2018 IEEE 13th International Symposium on Industrial Embedded Systems (SIES), Jun. 6, 2018, pp. 1-4, XP033389511.

EP Search Report mailed May 12, 2025 in re EP Application No. 24219370.4.

\* cited by examiner

SYSTEM AND METHOD FOR MONITORING CARGO DURING TRANSPORTATION

TECHNOLOGICAL FIELD

The present disclosure relates generally to the field of monitoring cargo that is being transported by a vehicle and, more specifically, to systems and methods of determining a location of the cargo on the vehicle and one or more environmental conditions of the location within the vehicle where the cargo is located.

BACKGROUND

Some cargo that is transported by vehicles is required to be stored in a controlled environment. Examples of this type of cargo includes but is not limited to perishable items such as medicine and food. The cargo is shipped within the controlled environment to ensure it does not spoil or otherwise become damaged. For example, various food items may spoil if exposed to temperatures above or below an operational range.

Existing solutions are not effective in monitoring the environment of the cargo while being transported by a vehicle. Some vehicles are not equipped with systems to monitor the environment of a cargo hold. The environmental conditions to which the cargo is exposed is unknown. This prevents an accurate determination of whether the cargo has spoiled. Other systems only provide for limited monitoring, such as when the cargo is being loaded and unloaded from the vehicle. The monitoring is thus limited and the environment of the cargo hold during the transport is not known.

Other systems have been implemented that include relatively cumbersome equipment that is attached or otherwise associated with the cargo. This equipment can make loading and unloading the cargo more difficult and/or time consuming. Also, this equipment can make it more difficult to efficiently load the cargo into the cargo hold thus costing the vehicle operator as less cargo is moved by the vehicle. The equipment is further limited to controlling the environment of the cargo to which it is attached. This equipment can be expensive and has limited applicability.

SUMMARY

One aspect is directed to a system to monitor cargo in a cargo hold of a vehicle. The system comprises a communication network connected to the control unit and comprising wireless access points configured to be spaced apart in the cargo hold of the vehicle. Sensors are configured to be positioned in the cargo hold and to sense an environmental condition of the cargo hold. The sensors are configured to wirelessly transmit signals indicative of the environmental condition to one or more of the wireless access points. A control unit is connected to the communication network and comprises processing circuitry. The control unit is configured to: receive the signals from the sensors through the wireless communication network; based on the signals, determine cargo data comprising a location of the cargo within the cargo hold, the environmental condition in the cargo hold, and transmit the cargo data determined from the signals to a remote monitoring wireless access point.

In another aspect, the control unit is further configured to, based on the signals, determine that the environmental condition is outside of an operational range for the cargo.

In another aspect, the sensors comprise macro sensors that sense the environmental condition within a large area of the cargo hold, and micro sensors that sense the environmental condition within just a subsection of the large area.

In another aspect, the control unit is further configured to query the sensors to transmit the signals indicative of the environmental condition.

In another aspect, the control unit is configured to perform triangulation of the signals received from the sensors and determine the location of a cargo package that is positioned in the cargo hold.

In another aspect, the communication network comprises access points configured to wirelessly receive the signals from the sensors, and gateways positioned between the access points to route the signals towards the control unit.

In another aspect, the environmental conditions comprise a temperature in the cargo hold.

In another aspect, the sensors are further configured to sense movement of the cargo while the cargo is positioned in the cargo hold.

One aspect is directed to a system to monitor cargo in a cargo hold of a vehicle. The system comprises first sensors mounted to a shipping unit or the cargo hold with the first sensors configured to sense an environmental condition of a general area within the cargo hold. Second sensors are mounted to cargo packages that are supported by one of the shipping units with each of the second sensors configured to sense the environmental condition where the cargo package is located in the cargo hold. A control unit comprises processing circuitry and is wirelessly connected to the first and second sensors. The control unit is configured to: based on first signals from the first sensors determine the environmental condition within two or more of the general areas within the cargo hold; determine that the environmental condition at a first one of the general areas is outside an operational range; based on second signals from the second sensors that are located in the first one of the general areas, confirm that the environmental condition is outside of the operational range; and in response to confirming the environmental condition is outside the operational range, adjust an operational control of the vehicle.

In another aspect, the control unit is further configured to determine that the one environmental condition is not outside of the operational range after adjusting the operational control of the vehicle.

In another aspect, a communication network extends within the cargo hold with the communication network comprising wireless access points that receive the first and second signals and a signal path to transmit the first and second signals to the control unit.

In another aspect, the control unit is configured to determine the locations of the cargo packages in the cargo hold based on the second signals from the second sensors.

In another aspect, the first sensors are configured to periodically transmit the first signals to the control unit and the second sensors are configured to transmit the second signals after receiving a request from the control unit.

In another aspect, the control unit is configured to determine that the environmental condition at the first one of the general areas is outside the operational range based on just the first signals from the first sensors and prior to receiving the second signals from the second sensors.

In another aspect, the control unit is further configured to determine movement of the cargo packages in the cargo hold based on just the second signals.

One aspect is directed to a method of monitoring cargo in a cargo hold of a vehicle. The method comprises: receiving signals from first sensors and second sensors that are positioned within the cargo hold; based on the signals from the first sensors determining an environmental condition within a plurality of general areas within the cargo hold; based on the signals from the first sensors determining that the environmental condition is outside of an operational range in one of the general areas; based on the signals from the second sensors confirming that the environmental condition is outside of the operational range in the one general area; determining which of the cargo is positioned in the one general area wherein the environmental condition is outside of the operational range; and adjusting an operational control of the vehicle to change the environmental condition within the one general area.

In another aspect, the method further comprises: receiving the first signals; determining that the environmental condition is outside of the operational range within the one general area based on the first signals; and after determining the environmental condition is outside of the operational range, receiving the second signals.

In another aspect, the method further comprises determining the position of the cargo in the cargo hold based on the signals from the second sensors.

In another aspect, the method further comprises the first sensors periodically transmitting the first signals to the control unit and the second sensors transmitting the second signals after receiving a request.

In another aspect, the method further comprises transmitting a signal that the environmental condition is outside of the operational range in the one general area to a remote monitoring wireless access point while the vehicle is in flight.

The features, functions and advantages that have been discussed can be achieved independently in various aspects or may be combined in yet other aspects, further details of which can be seen with reference to the following description and the drawings.

DETAILED DESCRIPTION

The present application is directed to monitoring systems and methods of monitoring cargo on a vehicle during transport. The monitoring includes determining the location of the cargo that is loaded on the vehicle and monitoring one or more environmental conditions of the vehicle where the cargo is located.

Figure 1:
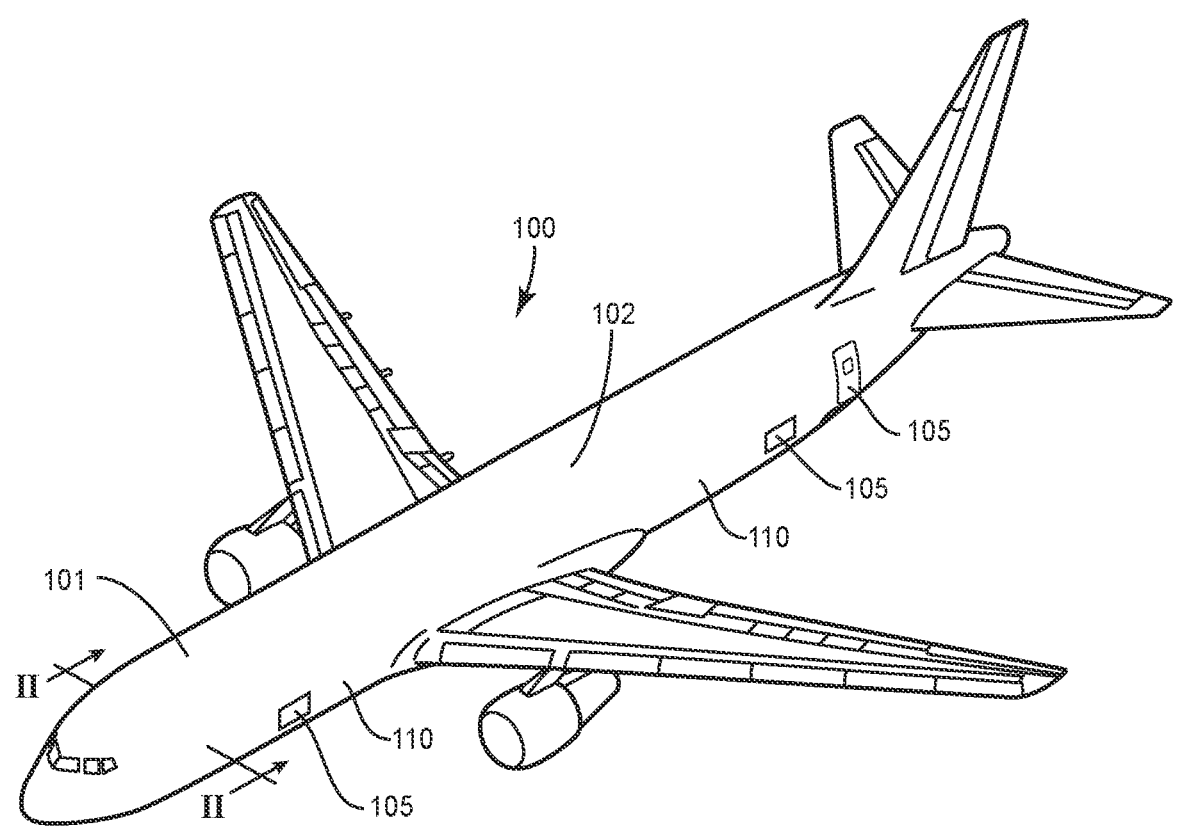
FIG. 1 is a perspective view of a vehicle.

FIG. 1 illustrates a vehicle 100 that is used to transport cargo. For purposes of explanation, this application uses an aircraft as an example of a vehicle 100. The monitoring system can also be used with other types of vehicles 100. As illustrated in FIG. 1, the aircraft 100 includes a fuselage 101 configured to hold cargo. One or more doors 105 lead into a cargo hold 110 formed within the interior of the fuselage 101.

Figure 2:
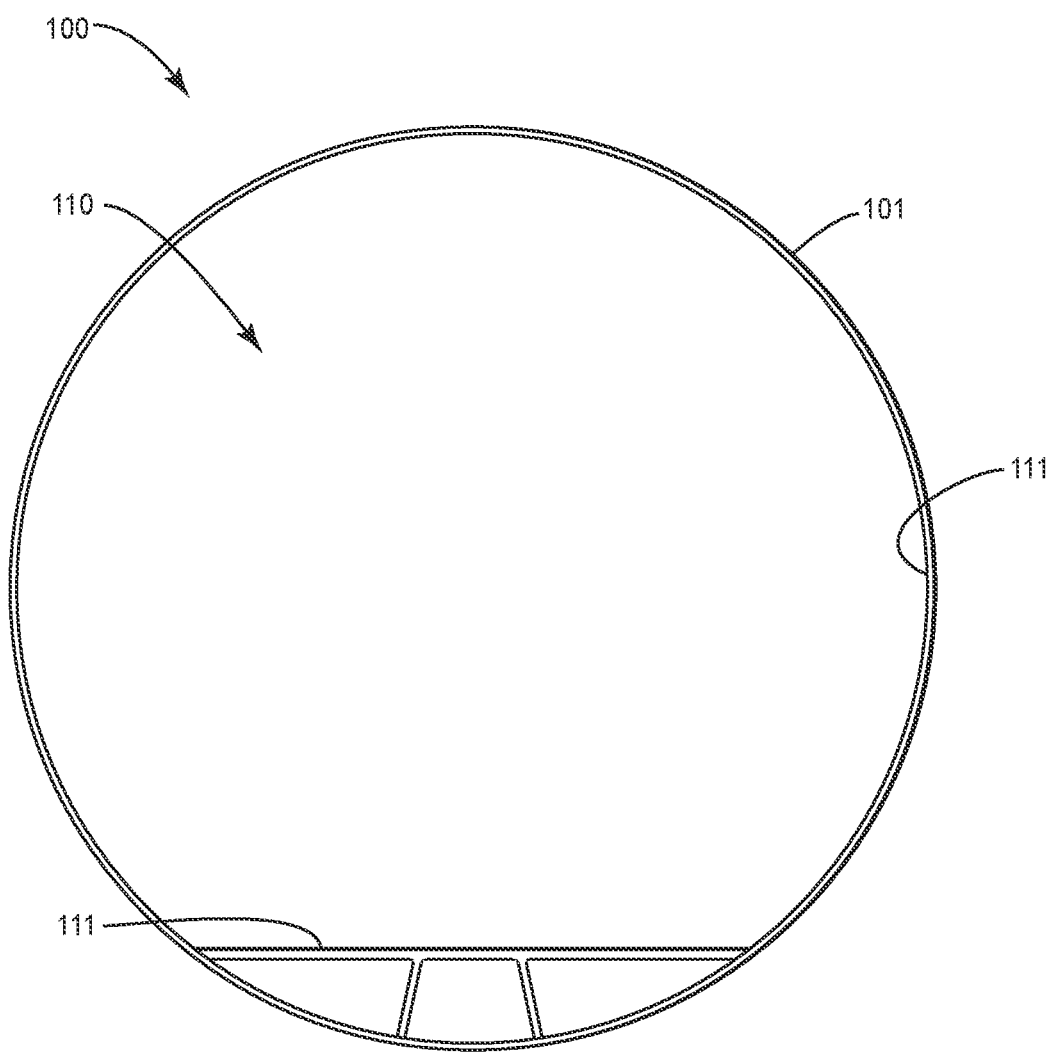
FIG. 2 is a section view of the vehicle cut along line II-II of FIG. 1.

FIG. 2 illustrates a sectional view of the fuselage 101 that includes the cargo hold 110.

Figure 3:
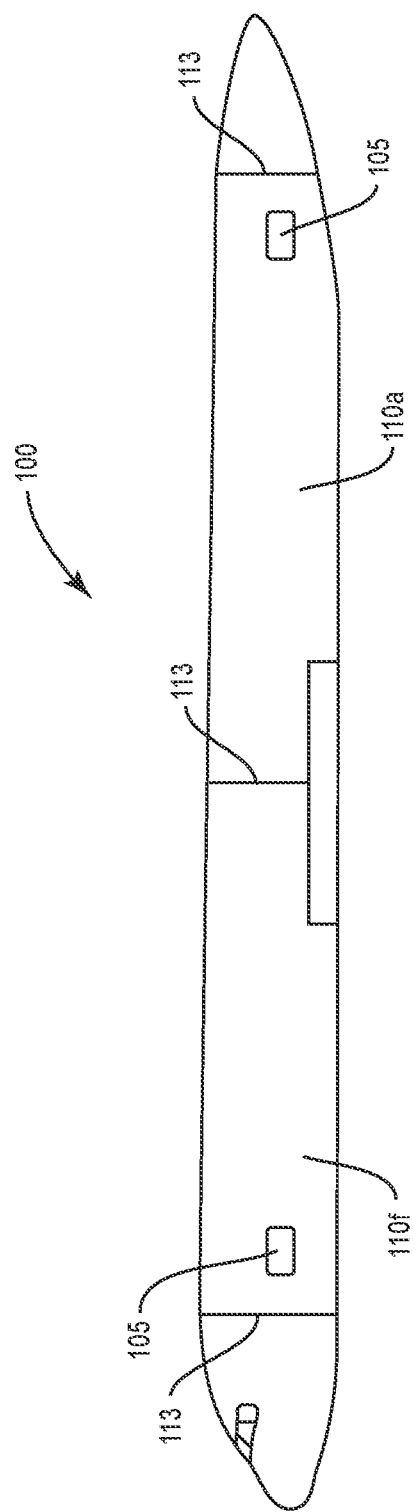
FIG. 3 is a side view of a vehicle with wings removed for clarity.

The cargo hold 110 is enclosed within the fuselage 101. The cargo hold 110 includes outer walls 111 that include one or more of a floor, ceiling, and side walls. The walls 111 can be formed by the interior of the walls of the fuselage 101, or can be separate components that are positioned within the interior of the fuselage 101. The cargo hold 110 can include various shapes and sizes to hold a wide variety of cargo. The cargo hold 110 can be divided into smaller sections as needed. In one example, the cargo hold 110 divided into two lateral sections including a starboard section and a port section. The sections can also be divided along the length of the aircraft 100. FIG. 3 illustrates a side schematic view of the fuselage 101 with the wings removed for clarity. The cargo hold 110 is divided by walls 113 in various sections along the length including a forward cargo section 110f and an aft cargo section 110a.

Figure 4:
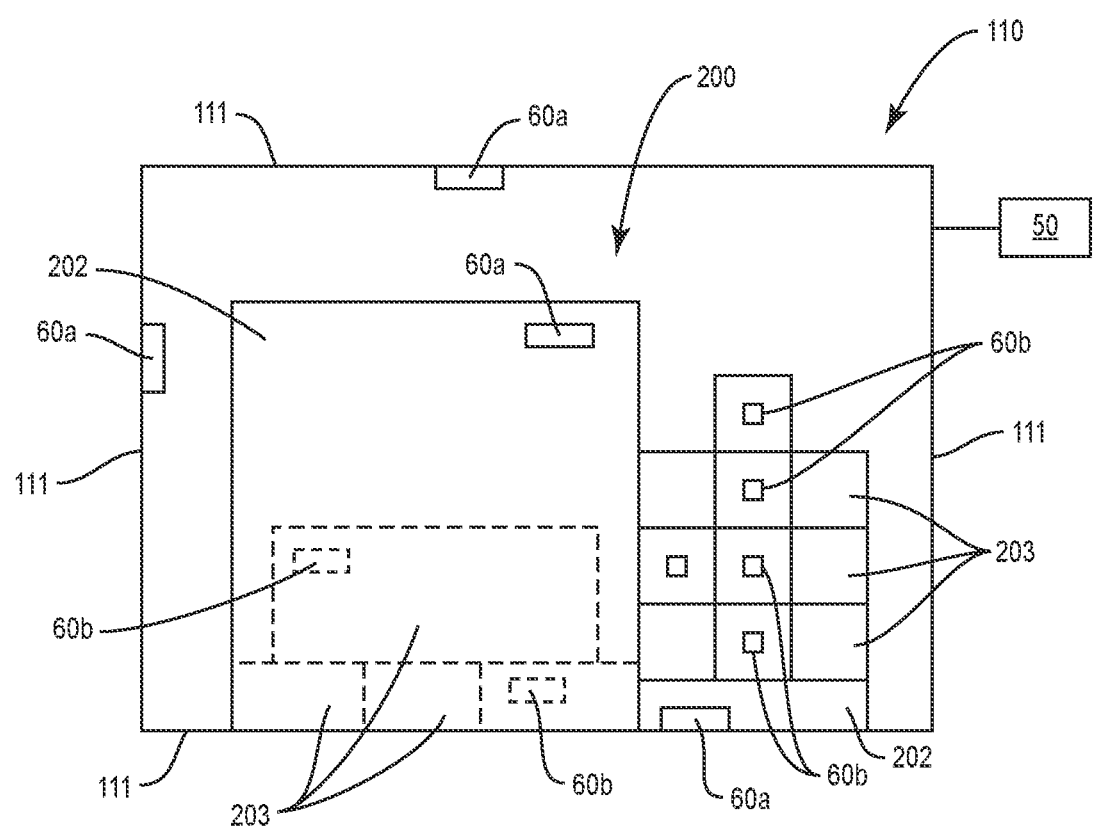
FIG. 4 is a schematic diagram with cargo positioned in a cargo hold and with sensors positioned to detect conditions in the cargo hold and with the cargo.

The cargo 200 can be in various configurations when being transported by the vehicle 100. FIG. 4 illustrates cargo 200 positioned in the cargo hold 110. The cargo 200 includes individual packages 203 that are loaded on shipping units 202. The packages 203 include the goods themselves that are wrapped or otherwise placed in boxes or bags. The shipping units 202 are configured to hold two or more of the packages 203. The shipping units 202 include a base and can include one or more walls. Examples of shipping units 202 include various Unit Load Devices (ULD) such as but not limited to pallets, crates, and refrigeration units.

A heating/cooling (HVAC) system 50 provides for maintaining the cargo hold 110 at a desired temperature. The HVAC system 50 can include various vents and air moving devices to provide heated air or cooled air to the cargo hold 110. The HVAC system 50 can be a separate system used for just the cargo hold 110 or can be part of a larger ventilation system that also provides for heating and cooling the cabin area 102. In addition to controlling the temperature, the HVAC system 50 can also be configured to control other environmental conditions of the cargo hold 110 such as the humidity levels.

Figure 5:
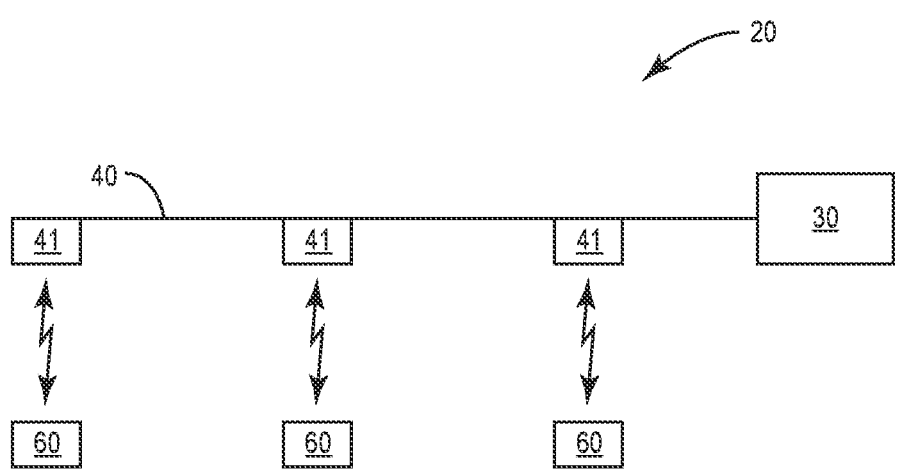
FIG. 5 is a schematic diagram of a monitoring system for use with sensors.
Figure 6:
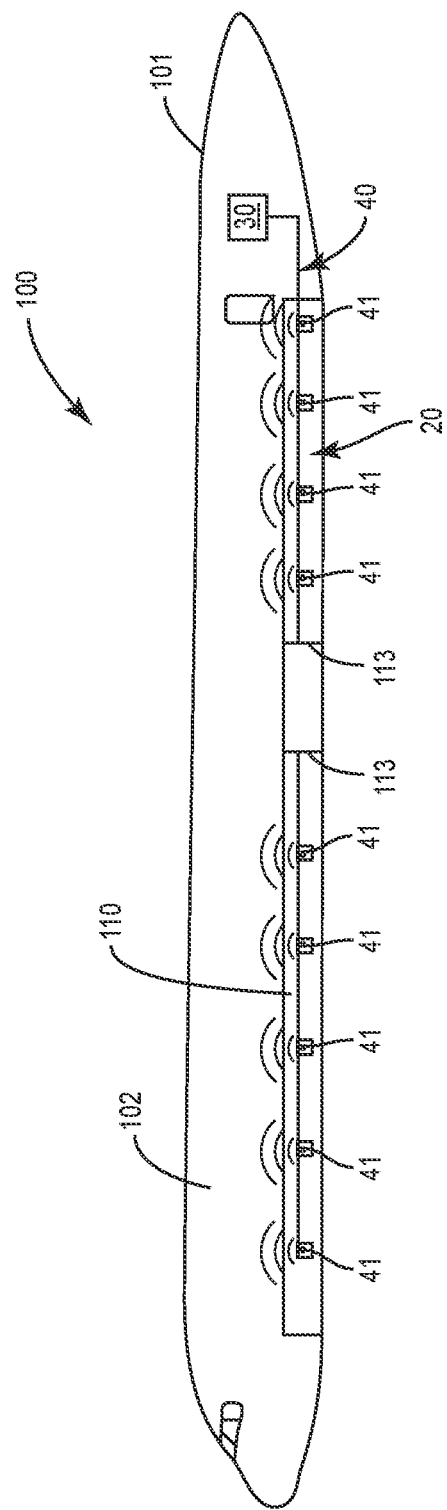
FIG. 6 is a side view of a monitoring system positioned within a vehicle.

A monitoring system 20 is configured to monitor the status of cargo 200 in the cargo hold 110. This includes the location of the cargo 200 and one or more environmental conditions of the cargo hold 110. FIG. 5 illustrates a monitoring system 20 that include a control unit 30 that is connected to a network 40. The network 40 includes wireless access points 41 that receive signals from sensors 60 that sense conditions of the cargo 200 and a signal path that forwards the signals to the control unit 30. The network 40 can be a local area network (LAN) that communicatively interconnects the control unit 30 with the wireless access points 41. The connections between these components may be wireless and/or hardwired, but in one aspect, the LAN comprises one or more routers and switches (and any other devices needed) configured to direct data and information between the components.

The wireless access points 41 form access points for receiving signals from sensors 60 that are associated with the cargo 200. In one example, the wireless access points 41 are receivers that receive the wireless signals from the sensors 60. For example, the wireless access points 41 provide wireless communications through one or more of BLUETOOTH, WiFi, or Light Fidelity (LiFi) signaling. In one example, the network 40 includes each of the wireless access points 41 being the same (e.g., each wireless access point is a WiFi wireless access point). In another example, different wireless access points provide for different signaling techniques.

In one example, one or more of the wireless access points 41 include gateways that consolidate data from one or more of the sensors 60. The gateways can also function as bridges to connect the sensors 60 to the control unit 30 and can act both as routers and wireless access points.

The network 40 can have various configurations. In one example, the network 40 includes the wireless access points 41 functioning as routers that pass data along to other wireless access points 41. In another example, the network 40 has a star topology in which the wireless access points 41 are directly connected to a central hub or gateway which then relays messages to/from the control unit 30.

The network 40 can provide for one-way communication in which the sensors 60 transmit signals about the cargo which moves along the network 40 in a first direction to the control unit 30. The network 40 can also be configured to provide for two-way communication in which the control unit 30 is able to send signals to the wireless access points 41 and/or sensors 60. For example, the control unit 30 can query one or more of the wireless access points 41 and/or sensors 60 for sensed data.

Figure 7:
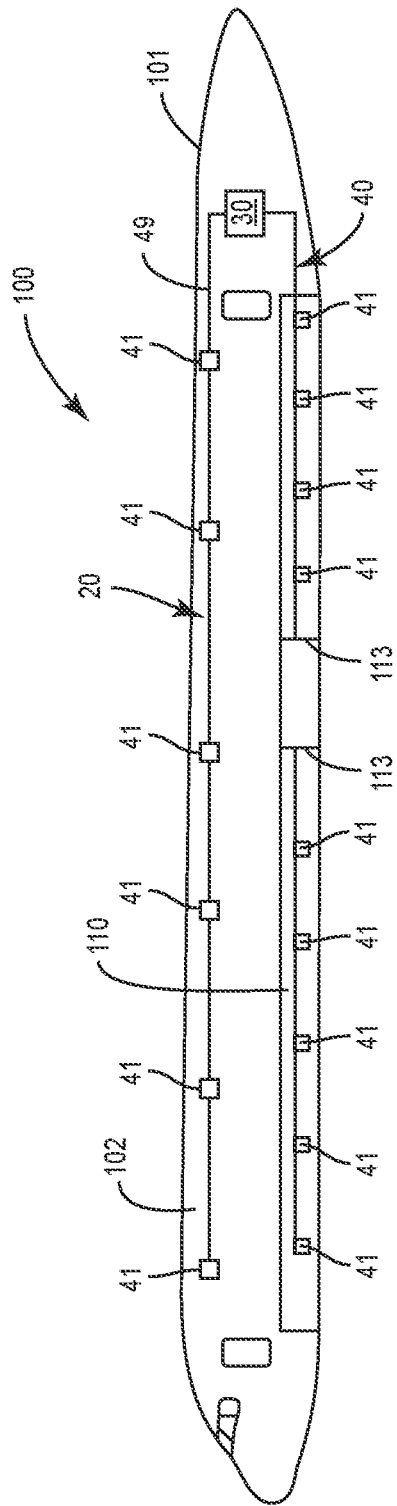
FIG. 7 is a side view of a monitoring system positioned within a vehicle.

In one example, the network 40 is a separate system for use in monitoring the cargo 200. FIG. 7 illustrates this type of network 40 that extends just through the cargo hold 110. Wireless access points 41 are positioned throughout the cargo hold 110. The network 40 can also be incorporated with one or more other networks 49 in the aircraft 100. In one example, the network 49 is configured to provide WiFi accessibility to the passengers while traveling in the cabin area 102. In one example, the wireless access points 41 within the cabin area 102 service the passengers and the wireless access points 41 in the cargo hold 110 monitor the cargo 200. In a shared network, one or more of the wireless access points 41 in the cabin area 102 can also receive and/or send signals to/from the sensors 60 in the cargo hold 110 and supplement the overall monitoring system 20. In another example, the monitoring system 20 just includes the network 49 in the cabin area 102 which receives signals from the sensors 60 located in the cargo hold 110. In the various arrangements, the network 40 can provide for one-way or two-way communications.

Figure 8:
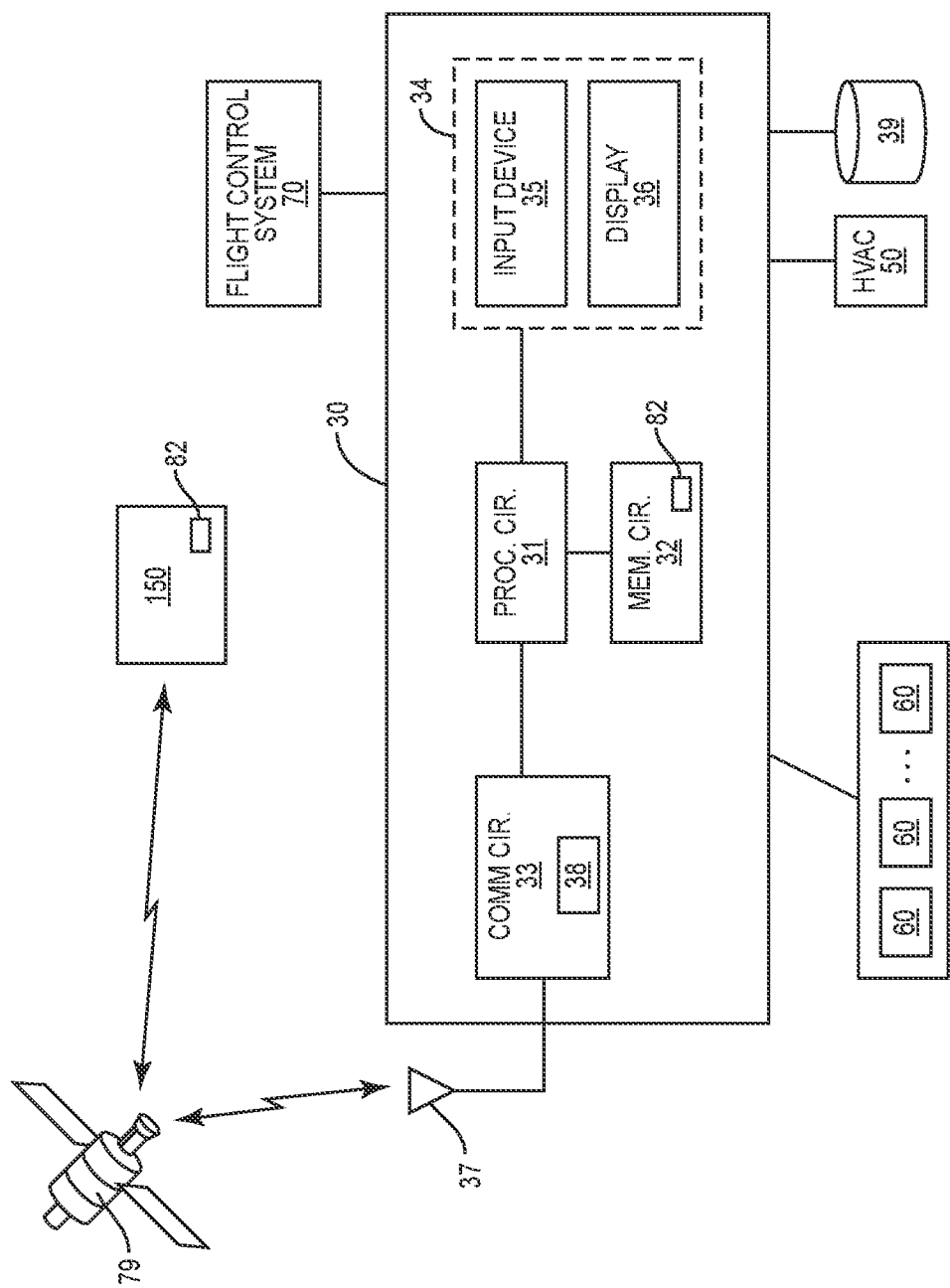
FIG. 8 is a schematic diagram of a control unit.

The control unit 30 monitors the status of the cargo 200 in the cargo hold 110. As illustrated in FIG. 8, the control unit 30 includes processing circuitry 31 and memory circuitry 32. The processing circuitry 31 controls overall operation of the monitoring system 20 according to program instructions stored in the memory circuitry 32. The processing circuitry 31 includes one or more circuits, microcontrollers, microprocessors, hardware, or a combination thereof. Memory circuitry 32 includes a non-transitory computer readable storage medium storing program instructions, such as a computer program product, that configures the processing circuitry 31 to implement one or more of the techniques discussed herein. Memory circuitry 32 can include various memory devices such as, for example, read-only memory, and flash memory. Memory circuitry 32 can be a separate component as illustrated in FIG. 8 or can be incorporated with the processing circuitry 31. Alternatively, the processing circuitry 31 can omit the memory circuitry 32, e.g., according to at least some embodiments in which the processing circuitry 31 is dedicated and non-programmable.

The communications circuitry 33 is configured to receive signals through the network 40 from the sensors 60. In one example, the communications circuitry 33 includes an interface configured to communicate with the network 40, e.g., via a wireless access point. In one example, the interface operates according to the 802.11 family of standards, which is commonly known as a WiFi interface. The communication circuitry 33 can also configured to communication with a flight control system 70 that oversees operation of the aircraft 100. This communication circuitry 33 can also provide for communication with the HVAC system 50, either directly or through the flight control system 70.

The communication circuitry 33 is further configured to communicate with a remote monitoring node 150. This includes communications when the aircraft 100 is on the ground as well as when in flight. In one example, the communication circuitry 33 includes a satellite module 38 configured to communicate content through one or more antennas 37 to satellites 79. In another example, however, the communication circuitry 33 includes a cellular modem that provides cellular connectivity to the one or more remote sources 150. In these cases, the communication circuitry 33 is configured to send and receive signals via a cellular network. In another example, the communication circuitry 33 is configured to communicate with the flight control system 70 which then provides for the external communication to the remote monitoring node 150.

A user interface 34 provides for a user on the vehicle 100 to access information about the cargo 200. The user interface 34 can include one or more input devices 35 such as but not limited to a keypad, touchpad, roller ball, and joystick to allow for commands to be entered to the processing circuitry 31. The user interface 34 can also include one or more displays 36 for displaying information to the user. The information at the control unit 30 can be stored in a database 39. The database 39 can be separate from the control unit 30 as illustrated in FIG. 8, or can be incorporated with the control unit 30.

The sensors 60 sense one or more conditions of the cargo hold 110. This can include various environmental conditions of the cargo hold 110. Examples of environmental conditions include but are not limited to temperature, humidity, pressure, and UV exposure. This can also include movement of the cargo 200, such as but not limited to vibration and an orientation of the cargo 200 (e.g., upright, inverted, angled).

The sensors 60 are wireless devices that produce outputs, such as electrical signals, that are transferred to the wireless access points 41 of the network 40. The sensors 60 can include various components to detect the various conditions in different manners including but not limited to inductive, ultrasonic, infrared, microwave, laser, pulse radar, and RF. In one example, the sensors 60 include accelerometers, gyroscopes, and piezoelectric sensors. In one example, the sensors 60 are light detection and ranging (LiDAR) sensors.

The sensors 60 are configured to communicate with the wireless access points 41 in various manners, including but not limited to one or more of WiFi, Bluetooth, and Near Field Communication (NFC).

The sensors 60 are arranged at different granularities within the cargo hold 110. One or more of the sensors 60 sense larger, macro-level conditions of relatively large areas of the cargo hold 110. In one example, a macro sensor 60 detects one or more environmental conditions of an enclosed section of the cargo hold 110 (e.g., section 110s or section 110p as illustrated in FIG. 2). Another example includes a first sensor 60 that senses a first relatively large forward area of an enlarged cargo hold 110 and a second sensor 60 that senses a rear area of the enlarged cargo hold 110. One or more sensors 60 detect smaller, micro-level conditions within the larger macro-level areas. For example, micro sensors 60 detect different smaller sub-sections of the large forward area of the enlarged cargo hold. The micro and macro sensors 60 can use the same or different sensing technologies.

FIG. 4 illustrates one example of macro and micro sensors 60 positioned in the cargo hold 110. The macro sensors 60a are positioned on the shipping units 202, and walls 111, 113 of the cargo hold 110. These macro sensors 60a detect conditions of a larger area of the cargo hold 110. Micro sensors 60b are attached to the individual packages 203 to sense the condition immediately at the packages 203. The micro sensors 60b detect more specific locations and/or subareas within the cargo hold 110 than the macro sensors 60a.

The division between macro-level and micro-level sensing can facilitate limiting an amount of signals that are sent to the control unit 30. For example, the control unit 30 can initially use signals from just the macro sensors 60a to monitor the cargo 200. Upon an indication of an issue, the control unit 30 can then use signals from one or more of the micro sensors 60b to confirm and or determine a scope of a potentially problematic condition.

In one example, each of the sensors 60 are the same. The micro sensors 60 are attached to the individual packages 203 and thus are able to sense more specific aspects of the area where the packages 203 are positioned in the cargo hold 110. The macro sensors 60 are positioned away from the individual packages 203 and thus sense more general conditions about the larger environment of the cargo hold 110. In another example, the macro sensors 60 sense a different condition than the micro sensors 60. For example, the macro sensors 60 are configured to sense an environmental condition and the micro sensors 60 are configured to determine a location of the package 203 to which it is attached.

In one example, each of the packages 203 on a shipping unit 202 include a micro sensor 60b. In another example, just a limited number of packages 203 include a micro sensor 60b. For example, just the packages 203 on the exterior of the shipping unit 202 include micro sensors 60b. These outer packages 203 can be exposed to more drastic changes in environmental conditions (e.g., temperature) and thus are equipped with sensors 60. The interior packages 203 do not include micro sensors 60b and the sensed conditions from the one or more micro sensors 60b attached to other packages 203 on the shipping unit 202 are used for data for these packages 203.

In one example in which multiple packages 203 are packaged within the interior space of an enclosed shipping unit 202, such as an enclosed container or a refrigeration container, a limited number of packages 203 are equipped with micro sensors 60. This is because the environment of the interior space of the container 202 is equal and a limited number of sensors 60 are necessary to sense the one or more environment conditions. In one example, just a single package 203 is equipped with a micro sensor 60b for an enclosed container.

One or more sensors 60 can be positioned to sense the cargo 200 during loading and unloading onto and from the vehicle 100. In one example, one or more sensors 60 are positioned at doors 105 in the fuselage 101 that lead into the cargo hold 110. Sensors 60 can also be configured to be portable by a person that is loading/unloading the vehicle 100. These sensors 60 can be manually operated by the person. The manual sensors 60 can be configured to be operated by the person while positioned within the cargo hold 110, as well as outside of the cargo hold 110 and in proximity to the vehicle 100 such as on the ground during loading and unloading.

Figure 9:
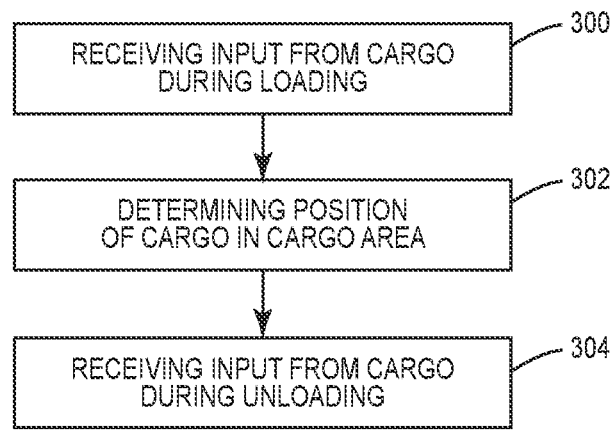
FIG. 9 is a flowchart diagram of a method of monitoring cargo.

The monitoring system 20 is configured to monitor the location of the cargo 200. FIG. 9 illustrates one example of a method of monitoring the cargo 200. The control unit 30 receives a signal from one or more sensors 60 that are attached to the cargo 200 (block 300). The control unit 30 receives the signal and determines the location of the cargo 200. The location is determined based on the location of the one or more wireless access points 41 and/or location data from the sensor 60. In one example, the signal occurs during loading of the cargo 200, such as by a manual sensor 60 that senses the cargo 200 while still on the ground. Another example includes the signal received by a wireless access point 41 within the vehicle 100 while the cargo 200 is being moved in the cargo hold 110.

In one example, the location of the cargo 200 is based on the location of the one or more wireless access points 41 that receive the signals. In another example, the sensors 60 are equipped with location detection circuitry, such as GPS circuitry. The sensors 60 transmit this location data to the wireless access points 41 which is then used by the control unit 30 to determine the location of the cargo 200.

The control unit 30 determines the travel position which is the location of the cargo 200 within the cargo hold 200 (block 302). This is the location where the cargo 200 is located during the transportation (e.g., flight, land shipping). In one example, the control unit 30 determines this position based on receiving the signal after the cargo hold 110 has been loaded. In another example, the control unit 30 determines the position based on the location of the one or more wireless access points 41 receiving a signal from the cargo 200. In another example, the control unit 30 determines the position based on receiving multiple signals from the sensor 60 at different times indicating that the cargo 200 is no longer being moved in the cargo hold 110. In one example, the control unit 30 receives signals from multiple sensors 60 and performs triangulation calculations to determine the location of the cargo 200 in the cargo hold 110. In one example, the control unit 30 determines the locations of the cargo 200 in the cargo hold 110 based on just signals from the micro sensors 60.

After the flight has been completed, the control unit 30 monitors the location during unloading of the cargo 200 (block 304). One or more signals are received from the micro sensors 60 on the cargo 200 as the cargo 200 exits the cargo hold 110 through one of the doors 105 and is moved along the ground.

Figure 10:
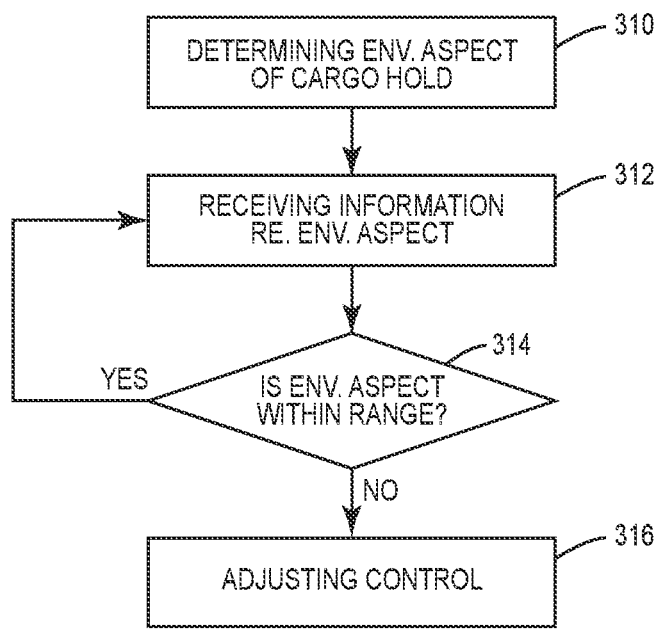
FIG. 10 is a flowchart diagram of a method of monitoring cargo at a travel position in a cargo hold.

The control unit 30 further monitors the environment of the cargo 200 while onboard the vehicle 100. FIG. 10 illustrates a method of monitoring the cargo 200 at its travel position in the cargo hold 110. Initially, the control unit 30 determines one or more environmental conditions about the cargo hold 110 (block 310). The initial environmental conditions can be determined at various times, including but not limited to when the cargo 200 is initially placed in its travel position, when loading is completed and the cargo hold 110 is secured, and once the vehicle 100 begins movement. The control unit 30 determines the one or more environmental conditions based on the signals from one or more sensors 60 associated with the cargo 200.

The control unit 30 receives periodic signals regarding the environmental conditions to monitor the status of the cargo 200 (block 312). In one example, the sensors 60 are configured to periodically transmit signals. In another example, the control unit 30 periodically queries the sensors 60. The control unit 30 determines whether the one or more environmental conditions are in an operational range (block 314). The operational range for the environmental conditions is the conditions at which the cargo 200 can be exposed without sustaining damage. For example, cargo 200 can have an operational range of temperatures in which they can be exposed during flight. The operational range can be provided in various manners including but not limited to by the owner of the cargo 200, determined based on the type of cargo, and based on a default setting stored at the control unit 30 for the cargo hold 110 (e.g., the cargo hold 110 is maintained within a temperature range of 50° F.-80° F. during flight).

When the environmental conditions are within the operational range, the control unit 30 continues to monitor the cargo 200. If one or more of the environmental conditions are outside of the operational range, the control unit 30 adjusts one or more environmental controls of the cargo hold 110 (block 316). For example, the control unit 30 can adjust the HVAC system 50 to raise or lower the temperature where the cargo 200 is located.

After adjustment, the control unit 30 can more closely monitor the one or more environmental conditions that are outside the range. For example, the control unit 30 increases the frequency of monitoring the environmental condition. The control unit 30 can also signal the flight control system 70 which notifies the pilot or other personnel operating the vehicle 100 of the issue. Additionally or alternatively, the control unit 30 signals the remote monitoring node 150 about the issue.

In the event that the environmental condition returns to within the operational range, the control unit 30 resumes normal monitoring. If the environmental condition remains outside the range after a predetermined time period, the control unit 30 signals an alarm to the flight control system 70 and/or the remote monitoring node 150 for corrective action to be taken as necessary.

Figure 11:
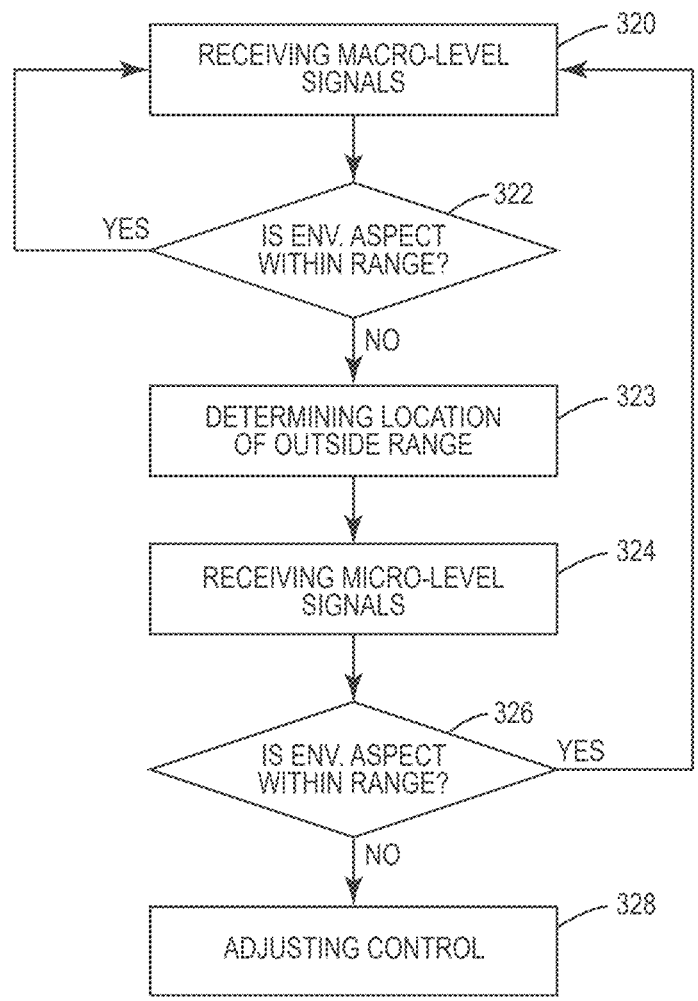
FIG. 11 is a flowchart diagram of a method of monitoring an environmental condition.

The micro and macro level sensing can be used to limit or minimize signals that are sent and processed through the monitoring system 20. FIG. 11 illustrates one method in which the control unit 30 receives signals from the macro-level sensors 60 (block 320). These sensors 60 sense more general conditions about the cargo 200 and/or the cargo hold 110. FIG. 11 illustrates a method that monitors a single environmental condition, although additional environmental conditions can be monitored in a similar manner.

The control unit 30 determines if the sensed environmental condition is within the operational range (block 322). If the environmental condition is within the operational range, the control unit 30 continues to monitor the cargo 200 at the macro level. If the environmental condition is outside the operational range, the control unit 30 determines the location within the cargo hold 110 where the issue has occurred (block 323). This determination can occur by determining which of the one or more macro sensors 60 provided the one or more signals corresponding to the out-of-range data.

After determining the location of the issue, the control unit 30 receives signals from one or more micro-level sensors 60 (block 324). The micro-level sensors 60 provide for more specific data about the general area. In one example, this is due to the micro-level sensors 60 being positioned on the packages 203 within the general area. In another example, the sensor 60 is focused to detect environmental conditions within a more limited area detected by the macro sensors 60.

Based on the signals from the one or more micro-level sensors 60, the control unit 30 determines if the environmental condition is within range (block 326). If the control unit 30 determines the environmental condition is within the operational range, the control unit 30 monitors the cargo 200 again at the macro level. If the signals from the micro sensors 60 still indicate that the environmental condition is out of range, the control unit 30 adjusts one or more environmental controls of the cargo hold 110 (block 328). After adjustment, the control unit 30 can more closely monitor the environmental condition that is outside the range and/or can signal the flight control system 70 and/or the remote monitoring node 150.

The various sensors 60 can transmit signals to the control unit 30 at various timing frequencies. In one example, the macro sensors 60 periodically transmit their signals to the control unit 30, and the micro sensors 60 transmit their signals just after receiving a request from the control unit 30. In another example, one or more of the sensors 60 transmit a signal to the control unit 30 when a predetermined event occurs. Examples of predetermined events include but are not limited to an environmental condition above or below predetermined levels, and movement of the cargo 200 during flight.

The monitoring system 20 is further configured to provide for communications with the remote monitoring node 150. In one example, the monitoring system 20 communicates with the remote monitoring node 150 through one or more satellites 79 and ground stations during flight. Communications can also be completed through a mobile communication network, such as a cellular network operating according to communication standards now known or later developed (e.g., Wideband Code Division Multiple Access network, Long Term Evolution network) as well as through a WiFi interface. The communication functionality can be included with the communication circuitry 33 or with circuitry included in the flight control system 70.

Figure 12:
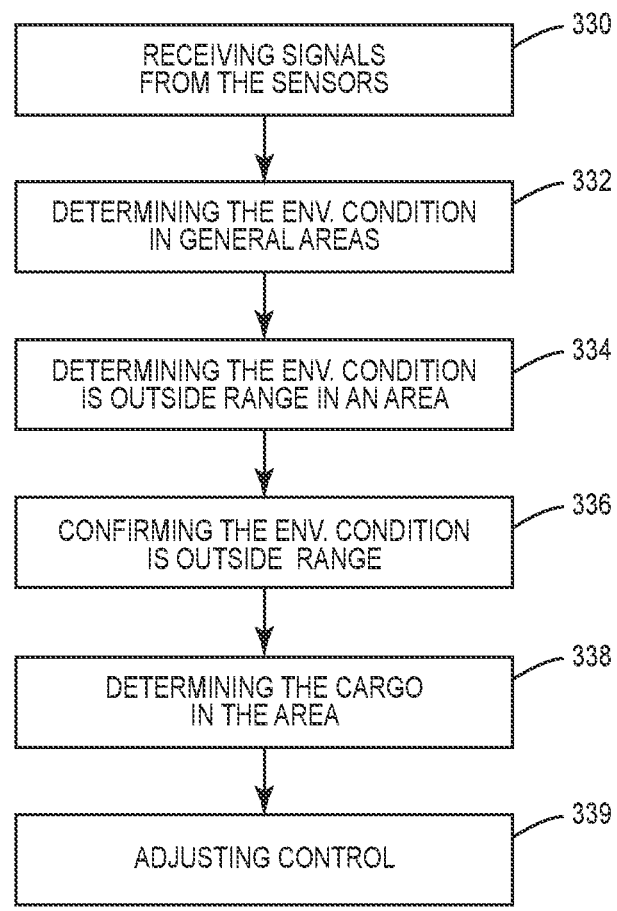
FIG. 12 is a flowchart diagram of a method of monitoring cargo in a cargo hold.

FIG. 12 illustrates a method of monitoring cargo 200 in a cargo hold 110. The control unit 30 receives signals from the macro and micro sensors 60 that are positioned within the cargo hold 110 (block 330). Based on the signals from the macro sensors 60, the control unit 30 determines an environmental condition within one or more general areas within the cargo hold 110 (block 332). The general areas can have various sizes and layouts. In one example, the general areas are each a contained space within the cargo hold 110. The general areas can also include subsections of a larger open area.

The control unit 30 determines that an environmental condition is outside of an operational range in one of the general areas based on the signals from the macro sensors (block 334). The control unit 30 then confirms that the environmental condition is outside of the operational range in the one general area based on the signals from the micro sensors 60 (block 336).

The control unit 30 determines the cargo 200 that is positioned in the general area where the environmental condition is outside of the operational range (block 338). The location of the cargo 200 is monitored during the loading of the cargo 200 in the cargo hold 110. The control unit 30 adjusts an operational control to change the environmental condition within the general area (block 339).

In one example, the control unit 30 initially determines that the environmental condition is outside of the operational range within the general area based on the signals from the macro sensors 60. Data from the micro sensors 60 is not used in the determination. After making this initial determination, the control unit uses the data from the micro sensors to confirm the issue.

In one example, the control unit 30 determines the position of the cargo 200 in the cargo hold 110 based on just the signals from the micro sensors 60.

A record 82 of the travel environment is maintained by the cargo 200. The records can include various information including but not limited to the type of cargo, the weight, the size, shipping dates, owner, and contact information. The records can also include the one or more operational ranges at which the cargo 200 is to be stored during transport. The record can be maintained at one or more of the control unit 30 and the remote monitoring node 150. A record 82 can be maintained at various granularities of the cargo 200. In one example, a record 82 is maintained for each package 203. In another example, a record is maintained for each shipping unit 202. In another example, a record 82 is maintained for the cargo 200 as a hold in the cargo hold 110.

Data about the cargo 200 stored in the record 82. Data can include one or more of the time the cargo 200 is loaded onto the vehicle 100, the travel position of the cargo 200 in the cargo hold 110, and the environmental conditions to which the cargo 200 is exposed during the travel. In one example, the control unit 30 stores the one or more sensed environmental conditions during the travel. This information can be used to ensure that the cargo 200 was transported within the operational ranges of the one or more environmental conditions. In the event an environmental condition is outside of the operational range (e.g., block 316 in FIG. 10), this exposure is indicated in the record 82 and can be used by personnel at a later time to determine the status of the cargo 200. In one example, the record 82 is a blockchain ledger.

Figure 13:
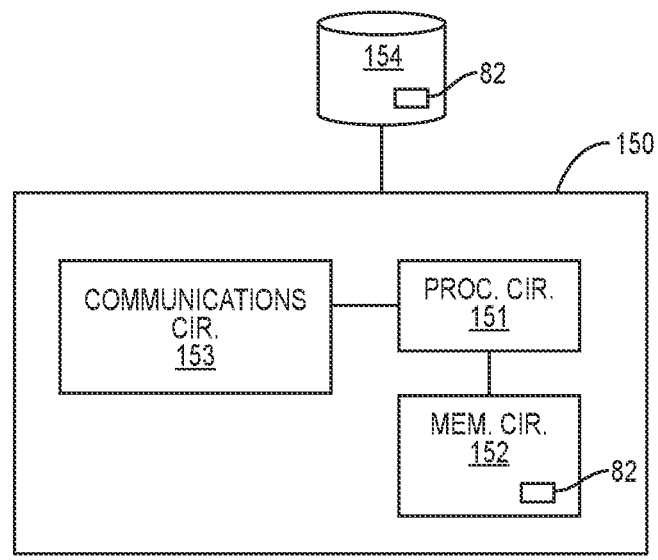
FIG. 13 is a schematic diagram of a remote monitoring wireless access point.

FIG. 13 illustrates a remote monitoring node 150 that includes one or more processing circuits (illustrated as processing circuitry 151) that may include one or more microprocessors, microcontrollers, Application Specific Integrated Circuits (ASICs), or the like, configured with appropriate software and/or firmware. A computer readable storage medium (shown as memory circuitry 152) stores data and computer readable program code that configures the processing circuitry 151 to implement the techniques described above. Memory circuitry 152 is a non-transitory computer readable medium and may include various memory devices such as random access memory, read-only memory, and flash memory. Communication circuitry 153 provides for communication with the vehicle 100, such as through ground stations and satellites 79 and/or a packet data network (PDN). The communications circuitry 153 also provides for communication with other sources such as through the PDN. The communications circuitry 153 can support a wired connection (e.g., Ethernet), a wireless connection, or both.

Records 82 and other data about the cargo 200 can be stored in the memory circuitry 152 and/or database 154. The database 154 is stored in a non-transitory computer readable storage medium (e.g., an electronic, magnetic, optical, electromagnetic, or semiconductor system-based storage device). The database 154 can be local or remote relative to the remote monitoring node 150.

In one example, the remote monitoring node 150 is configured to provide a web interface for access by one or more entities. The remote monitoring node 150 is configured for accessing information about the cargo 200 using a browser-based interface or an applications program interface (API). The browser-based interface can include a website through which the contents of the database 154 can be accessible. Although the website can be hosted by the remote monitoring node 150, it can also be hosted at another location accessible through the PDN. In one example, the remote monitoring node 150 is a server configured to store data about the cargo 200, communicate with the control unit 30 to obtain the status of the cargo 200, and provide for access by users, such as the owners of the cargo 200.

The control unit 30 is configured to communicate with the remote monitoring node 150 at various times, including prior to the flight such as during loading of the vehicle 100, during the flight, and post-flight such as during unloading of the cargo 200. The control unit 30 can act as an intermediate node to collect the information prior to transmission to the remote monitoring node 150. In one example, the data is transmitted periodically to the remote monitoring node 150. Additionally or alternatively, the remote monitoring node 150 can query the control unit 30 to transmit the data.

The control unit 30 can collect the data about the cargo 200. At some point after the collection, the data is transmitted to the monitoring node 150.

Figure 14:
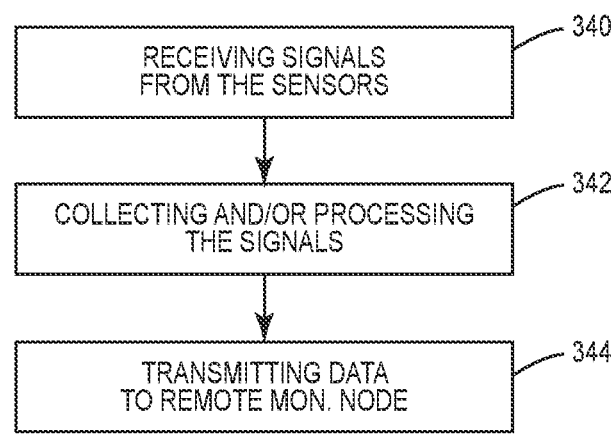
FIG. 14 is a method of communication between a vehicle and a remote monitoring wireless access point.

FIG. 14 illustrates a method of communication between the control unit 30 and the remote monitoring node 150. The control unit 30 receives signals from the sensors 60 indicating conditions about the cargo 200 (block 340). The control unit 30 processes the signals (block 342). In one example, this includes determining that one or more environmental conditions are out of the operational range. Processing can also include tracking an average of one or more of the environmental conditions (e.g., average temperature at the cargo 200), or maintaining the high and low values for one or more of the environmental conditions. The control unit 30 transmits data about the cargo 200 to the remote monitoring node 150 (block 344). In one example, the control unit 30 communicates the status to the remote monitoring node 150 only upon determining that one or more environmental conditions are outside of the operational range.

The remote monitoring node 150 can monitor the movement of cargo 200 on multiple different vehicles 100. The remote monitoring node 150 monitors the overall movement and can determine if there is an issue outside of normal operation procedures and report the issue as necessary. For example, normal operating procedures can indicate that an average of 5% of packages 203 are exposed to temperatures outside of the operational range. The remote monitoring node 150 can detect that a larger number of packages 203 are experiencing exposure to temperatures below the operating range. The remote monitoring node 150 can signal this information to a technician who can determine if changes need to be made to the procedural process of handling and shipping the cargo 200. For example, during winter it may be necessary to increase the heat in the cargo hold 110 to prevent exposure to low temperatures.

In one example, the control unit 30 determines that the cargo 200 has moved within the cargo hold 110 based on just signals from the micro sensors 60.

The device 10 can be used on a variety of vehicles 100. Vehicles 100 include but are not limited to aircraft, watercraft, and freight trailers for trains and trucks. FIG. 2 includes a cargo vehicle 100 in which the majority of the cargo hold 110 extends throughout the fuselage 101. In another example, the vehicle 100 is a passenger aircraft that includes a smaller cargo hold 110 and a separate cabin area in the fuselage 101.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A system to monitor cargo in a cargo hold of a vehicle, the system comprising:
    a communication network connected to a control unit and comprising wireless access points configured to be spaced apart in the cargo hold of the vehicle;
    first sensors configured to be positioned in the cargo hold and second sensors configured to be attached to cargo packages of the cargo and to sense an environmental condition of the cargo hold, the sensors further configured to wirelessly transmit signals indicative of the environmental condition to one or more of the wireless access points;
    the control unit connected to the communication network and comprising processing circuitry, the control unit configured to:
        receive the signals from just the first sensors through the wireless communication network;
        based on the signals from the first sensors, determine cargo data comprising:
            a location of the cargo within the cargo hold;
            the environmental condition of a large area of the cargo hold;
            compare the environmental condition of the large area against a predetermined threshold;
        in response to the environmental condition of the large area exceeding the predetermined threshold, determine the environmental condition at individual ones of the cargo packages based on the signals from the second sensors that are attached to the cargo packages located within the large area of the cargo hold;
        compare the environmental condition that is based on the second sensors with the predetermined threshold; and
        in response to the environmental condition based on the second sensors exceeding the predetermined threshold, change an operational setting and adjust the environmental condition in the cargo hold.

2. The system of claim 1, wherein the control unit, based on the signals, determines that the environmental condition is outside of an operational range for the cargo.

3. The system of claim 1, wherein the sensors comprise:
    macro sensors that sense the environmental condition within a large area of the cargo hold; and
    micro sensors that sense the environmental condition within just a subsection of the large area.

4. The system of claim 1, wherein the control unit queries the sensors to transmit the signals indicative of the environmental condition.

5. The system of claim 1, wherein the control unit performs triangulation of the signals received from the sensors and determines the location of the cargo packages that are positioned in the cargo hold.

6. The system of claim 1, wherein the communication network comprises:
    the access points configured to wirelessly receive the signals from the sensors; and
    gateways positioned between the access points to route the signals towards the control unit.

7. The system of claim 1, wherein the environmental condition comprises a temperature in the cargo hold.

8. The system of claim 1, wherein the sensors sense movement of the cargo while the cargo is positioned in the cargo hold.

9. A system to monitor cargo in a cargo hold of a vehicle, the system comprising:
    first sensors mounted to a shipping unit or the cargo hold, the first sensors configured to sense an environmental condition of a general area within the cargo hold;
    second sensors mounted to cargo packages that are supported by one of the shipping units, each of the second sensors configured to sense the environmental condition where the cargo package is located in the cargo hold;
    a control unit comprising processing circuitry and wirelessly connected to the first and second sensors, the control unit configured to:
        based on first signals from the first sensors, determine the environmental condition within two or more of the general areas within the cargo hold;
        compare the environmental condition determined based on the first signals with an operational range and determine that the environmental condition at a first one of the general areas is outside an operational range based on the first signals; and
        in response to determining that the environmental condition at the first one of the general areas is outside the operational range, compare the environmental condition determined based on the second signals with the operational range;
        based on the comparison confirm that the environmental condition is outside of the operational range based on second signals from the second sensors that are located in the first one of the general areas.

10. The system of claim 9, wherein the control unit determines that the environmental condition is not outside of the operational range after adjusting an operational control of the vehicle.

11. The system of claim 9, further comprising a communication network that extends within the cargo hold, the communication network comprising wireless access points that receive the first and second signals and a signal path to transmit the first and second signals to the control unit.

12. The system of claim 9, further comprising the control unit determines locations of the cargo packages in the cargo hold based on the second signals from the second sensors.

13. The system of claim 9, wherein the first sensors and the second sensors periodically transmit the first signals to the control unit.

14. The system of claim 9, wherein the control unit determines that the environmental condition at the first one of the general areas is outside the operational range based on just the first signals from the first sensors and prior to receiving the second signals from the second sensors.

15. The system of claim 9, wherein the control unit determines movement of the cargo packages in the cargo hold based on just the second signals.

16. A method of monitoring cargo in a cargo hold of a vehicle, the method comprising:
- receiving signals from first sensors and second sensors that are positioned within the cargo hold;
- based on the signals from the first sensors, determining an environmental condition within a plurality of general areas within the cargo hold;
- comparing the environmental condition in one or more of the general areas against an operational range based on the first sensors;
- based on the signals from the first sensors, determining that the environmental condition is outside of the operational range in one of the general areas;
- in response to determining the environmental condition is outside of the operational range, comparing the environmental condition based on the second sensors with the operational range;
- based on the signals from the second sensors, confirming that the environmental condition is outside of the operational range in the one general area;
- determining which of the cargo is positioned in the one general area wherein the environmental condition is outside of the operational range; and
- adjusting an operational control of the vehicle to change the environmental condition within the one general area.

17. The method of claim 16, further comprising:
- receiving the first signals;
- determining that the environmental condition is outside of the operational range within the one general area based on the first signals;
- after determining the environmental condition is outside of the operational range, receiving the second signals.

18. The method of claim 16, further comprising determining a position of the cargo in the cargo hold based on the signals from the second sensors.

19. The method of claim 16, further comprising the first sensors periodically transmitting the first signals to the control unit and the second sensors transmitting the second signals after receiving a request.

20. The method of claim 16, further comprising transmitting a signal that the environmental condition is outside of the operational range in the one general area to a remote monitoring node while the vehicle is in flight.

* * * * *